(12) United States Patent
Nohara et al.

(10) Patent No.: US 9,490,090 B2
(45) Date of Patent: Nov. 8, 2016

(54) FUSE UNIT

(71) Applicant: YAZAKI CORPORATION, Minato-ku, Tokyo (JP)

(72) Inventors: Mami Nohara, Shizuoka (JP); Masayoshi Yamazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/614,720

(22) Filed: Feb. 5, 2015

(65) Prior Publication Data

US 2015/0155120 A1 Jun. 4, 2015

Related U.S. Application Data

(63) Continuation of application No. PCT/JP2013/070999, filed on Aug. 2, 2013.

(30) Foreign Application Priority Data

Aug. 10, 2012 (JP) .................................. 2012-178458

(51) Int. Cl.
| | |
|---|---|
| *H01H 37/32* | (2006.01) |
| *H01H 37/00* | (2006.01) |
| *H01H 37/04* | (2006.01) |
| *H02J 7/00* | (2006.01) |
| *H01M 2/34* | (2006.01) |
| *H01H 85/20* | (2006.01) |
| *H01M 10/44* | (2006.01) |
| *H01M 10/46* | (2006.01) |
| *H01H 85/044* | (2006.01) |
| *H01H 1/58* | (2006.01) |
| *H01H 85/02* | (2006.01) |
| *H01H 85/055* | (2006.01) |

(52) U.S. Cl.
CPC ............ *H01H 37/32* (2013.01); *H01H 37/002* (2013.01); *H01H 37/04* (2013.01); *H01H 85/205* (2013.01); *H01M 2/34* (2013.01); *H01M 2/342* (2013.01); *H01M 10/441* (2013.01); *H02J 7/0052* (2013.01); *H01H 85/044* (2013.01); *H01H 2001/5877* (2013.01); *H01H 2085/025* (2013.01); *H01H 2085/0555* (2013.01); *H01M 10/46* (2013.01); *H01M 2200/103* (2013.01); *H01M 2200/30* (2013.01); *H01M 2220/20* (2013.01)

(58) Field of Classification Search
CPC .... H01H 37/32; H01H 37/002; H01H 37/04; H01H 85/205; H01H 2085/0555; H01H 2001/5877; H01H 2085/025; H01H 85/044; H01H 2085/208; H02J 7/0052; H01M 10/441; H01M 2/342; H01M 2/34; H01M 10/46; H01M 2200/103; H01M 2220/20; H01M 2200/30
USPC ....... 337/188, 216, 187, 186, 180, 197, 208, 337/209
See application file for complete search history.

(56) References Cited

U.S. PATENT DOCUMENTS 6,187,470 B1 * 2/2001 Peterson ............... H01M 2/105
429/100
2002/0163416 A1 11/2002 Matsumura
(Continued)

FOREIGN PATENT DOCUMENTS

JP 2002-329457 A 11/2002
JP 2011-086510 A 4/2011
(Continued)

*Primary Examiner* — Jerry Wu
*Assistant Examiner* — Stephen Sul
(74) *Attorney, Agent, or Firm* — Mots Law, PLLC

(57) ABSTRACT

An alternator connecting bolt of an alternator connecting end has a diameter different from that of a second battery connecting bolt of a second battery connecting end.

17 Claims, 5 Drawing Sheets

(56) References Cited

U.S. PATENT DOCUMENTS

2012/0302098 A1* 11/2012 Matsumoto ............ H01H 85/12
439/620.26
2013/0095696 A1 4/2013 Matsumura et al.

FOREIGN PATENT DOCUMENTS

| JP | 2011-233506 A | 11/2011 |
| JP | 2011-258488 A | 12/2011 |
| JP | 2012-038643 A | 2/2012 |

* cited by examiner

FUSE UNIT

CROSS REFERENCE TO RELATED APPLICATION

This is a continuation application based on PCT application No. PCT/JP2013/070999 filed on Aug. 2, 2013, which claims the benefit of priority from Japanese Patent Application No. 2012-178458 filed on Aug. 10, 2012, the entire contents of which are incorporated by reference herein.

BACKGROUND OF THE INVENTION

1. Field of the Invention

The present invention relates to a fuse unit used for power distribution in a vehicle equipped with two batteries.

2. Description of the Related Art

A fuse unit is directly attached to an onboard battery so as to distribute and supply electricity to loads such as electrical components (e.g., Japanese Unexamined Patent Application Publication No. 2011-86510). Such a fuse unit protects onboard electrical components against overcurrent by blocking current flow paths. When two batteries are mounted on a vehicle, a fuse unit is directly attached to one of the batteries.

FIG. 1 is a view showing a conventional fuse unit 100 used in a vehicle on which two batteries are mounted. FIG. 2 is a circuit diagram of a circuit body placed in the fuse unit 100.

The fuse unit 100 charges a first battery and a second battery (not shown in the figure) mounted on a vehicle with electricity generated by an alternator (not shown in the figure) through driving of the vehicle. The fuse unit 100 supplies currents from the first battery, the second battery and the alternator to electrical components (loads).

The fuse unit 100 includes a unit main body 110 (FIG. 1) and a circuit body 200 (FIG. 2) buried in the unit main body 110. The fuse unit 100 will be described below with reference to FIG. 1 and FIG. 2.

The unit main body 110 is entirely made of an insulating resin. As shown in FIG. 1, the unit main body 110 includes an upper surface portion 120 and a side surface portion 130 and is formed into an L-shape bent substantially at a right angle in a manner such that one end of the upper surface portion 120 is continuously connected to the side surface portion 130. The upper surface portion 120 of the unit main body 110 is placed and fixed onto the upper surface of the first battery so that the side surface portion 130 is positioned along the side surface of the first battery. Thus, the fuse unit 100 is attached to the first battery in a hanging state.

The upper surface portion 120 of the unit main body 110 includes a first battery connecting portion 121, an alternator connecting portion 122 and a second battery connecting portion 123. A first battery connecting end 201 of the circuit body 200 is located at the first battery connecting portion 121. An alternator connecting end 202 of the circuit body 200 is located at the alternator connecting portion 122. A second battery connecting end 203 of the circuit body 200 is located at the second battery connecting portion 123.

An insertion hole 205 is formed in the first battery connecting end 201. A connecting bolt (not shown in the figure) of a battery terminal connected to a battery post projecting from the upper surface of the first battery, is inserted into the insertion hole 205. The first battery connecting end 210 is connected to the first battery via the connecting bolt inserted into the insertion hole 205.

The alternator connecting end 202 is provided with an alternator connecting bolt 206. The alternator connecting bolt 206 vertically extends from the alternator connecting end 202. The alternator connecting bolt 206 extends in the same direction as the connecting bolt of the battery terminal connected to the first battery. The alternator connecting bolt 206 is connected to the onboard alternator via a wire. Thus, the alternator connecting end 202 is connected to the alternator.

The second battery connecting end 203 is provided with a second battery connecting bolt 207 vertically extending therefrom. The second battery connecting bolt 207 vertically extends from the second battery connecting end 203. The second battery connecting bolt 207 extends in the same direction as the alternator connecting bolt 206. The second battery connecting bolt 207 is connected to the second battery via a wire. Thus, the second battery connecting end 203 is connected to the second battery. The second battery connecting bolt 207 has the same diameter and extends in the same direction as the alternator connecting bolt 206.

As shown in FIG. 2, the first battery connecting end 201 is connected to the alternator connecting end 202 via a first fusible portion 211. The alternator connecting end 202 is connected to the second battery connecting end 203 via a second fusible portion 212. The first fusible portion 211 and the second fusible portion 212 are located at the upper surface portion 120 of the unit main body 110 (refer to FIG. 1). The first fusible portion 211 and the second fusible portion 212 each serve as a fuse that blows out once an overcurrent flows therethrough so as to protect the first battery and the second battery against the overcurrent from the alternator.

Since the first battery connecting end 201, the alternator connecting end 202 and the second battery connecting end 203 are all located at the upper surface portion 120 of the unit main body 110, the fuse unit 100 can be connected with the first battery, the alternator and the second battery simply via the upper surface portion 120 of the unit main body 110.

The side surface portion 130 of the unit main body 110 is provided with a load connecting portion 131 to be connected with a plurality of onboard loads 8 (refer to FIG. 2). The connection of the fuse unit 100 with the plural loads 8 is implemented at the side surface portion 130 of the unit main body 110. The alternator connecting end 202 is provided with a plurality of load-side terminal portions 215. The load-side terminal portions 215 are respectively connected to the onboard loads 8 via third fusible portions 213. Accordingly, the electricity generated by the alternator through driving of the vehicle is distributed and supplied to the onboard loads 8. As shown in FIG. 1, the third fusible portions 213 are located at the side surface portion 130 of the unit main body 110.

The connection of the fuse unit 100 with the first battery, the second battery and the alternator is carried out in the process of assembling the vehicle. The alternator connecting bolt 206 is connected to the alternator via the terminal of the wire while the fuse unit 100 is placed on the first battery. The second battery connecting bolt 207 is connected to the second battery via the terminal of the wire. Here, since the alternator connecting bolt 206 and the second battery connecting bolt 207 extend in the same direction and have the same diameter, the respective terminals of the wires may incorrectly be connected to the wrong bolts. Such incorrect assembly should be avoided because it inhibits the fuse unit 100 from operating properly.

SUMMARY OF THE INVENTION

An object of the present invention is to provide a fuse unit having a structure capable of preventing incorrect assembly.

An aspect of the present invention is a fuse unit used for a charging circuit in a vehicle for charging a first battery and a second battery mounted on the vehicle with electricity generated by a generator through driving of the vehicle, the fuse unit including: an insulating unit main body; a conductive circuit body integrally buried in the unit main body, the circuit body including, a first battery connecting end connected to the first battery, an alternator connecting end connected to the generator, and a second battery connecting end connected to the second battery; and a fusible body, connected to the circuit body, for blocking a current flow path when an overcurrent flows therethrough, the fusible body including, a first fusible portion formed between the first battery connecting end and the alternator connecting end, a second fusible portion formed between the alternator connecting end and the second battery connecting end, and a third fusible portion formed between the alternator connecting end and an electrical component installed in the vehicle, wherein the first battery connecting end is provided with an insertion hole into which a connecting bolt attached to a battery terminal connected to a battery post of the first battery and projecting from an upper surface of the first battery, is inserted, the alternator connecting end is provided with an alternator connecting bolt buried in the unit main body and extending in a direction identical with that in which the battery terminal extends, the second battery connecting end is provided with a second battery connecting bolt buried in the unit main body and extending in a direction identical with that in which the alternator connecting bolt extends, and the alternator connecting bolt has a diameter different from that of the second battery connecting bolt.

According to the aspect of the present invention, the alternator connecting bolt extending in the same direction as the connecting bolt of the battery terminal connected to the battery post of the first battery, is located at the alternator connecting end, and the second battery connecting bolt extending in the same direction as the alternator connecting bolt is located at the second battery connecting end. In addition, the alternator connecting bolt has a diameter different from that of the second battery connecting bolt. Therefore, incorrect connection of the terminals of the wires to the wrong bolts can be avoided. Accordingly, incorrect assembly can reliably be prevented at the time of connecting the fuse unit with the first battery, the second battery and the generator.

The alternator connecting end is provided with the alternator connecting bolt extending in the same direction as the connecting bolt of the battery terminal connected to the first battery, and the second battery connecting end is provided with the second battery connecting bolt extending in the same direction as the alternator connecting bolt. Since the first battery connecting end to be connected to the first battery, the second battery connecting end to be connected to the second battery and the alternator connecting end to be connected to the generator are all located at the upper surface portion of the unit main body, the connection of the fuse unit with the first battery, the second battery and the generator can be implemented only at the upper surface portion of the unit main body. This configuration contributes to simplifying and efficiently carrying out the connecting operation in a small working space.

DESCRIPTION OF THE EMBODIMENTS

Figure 1:
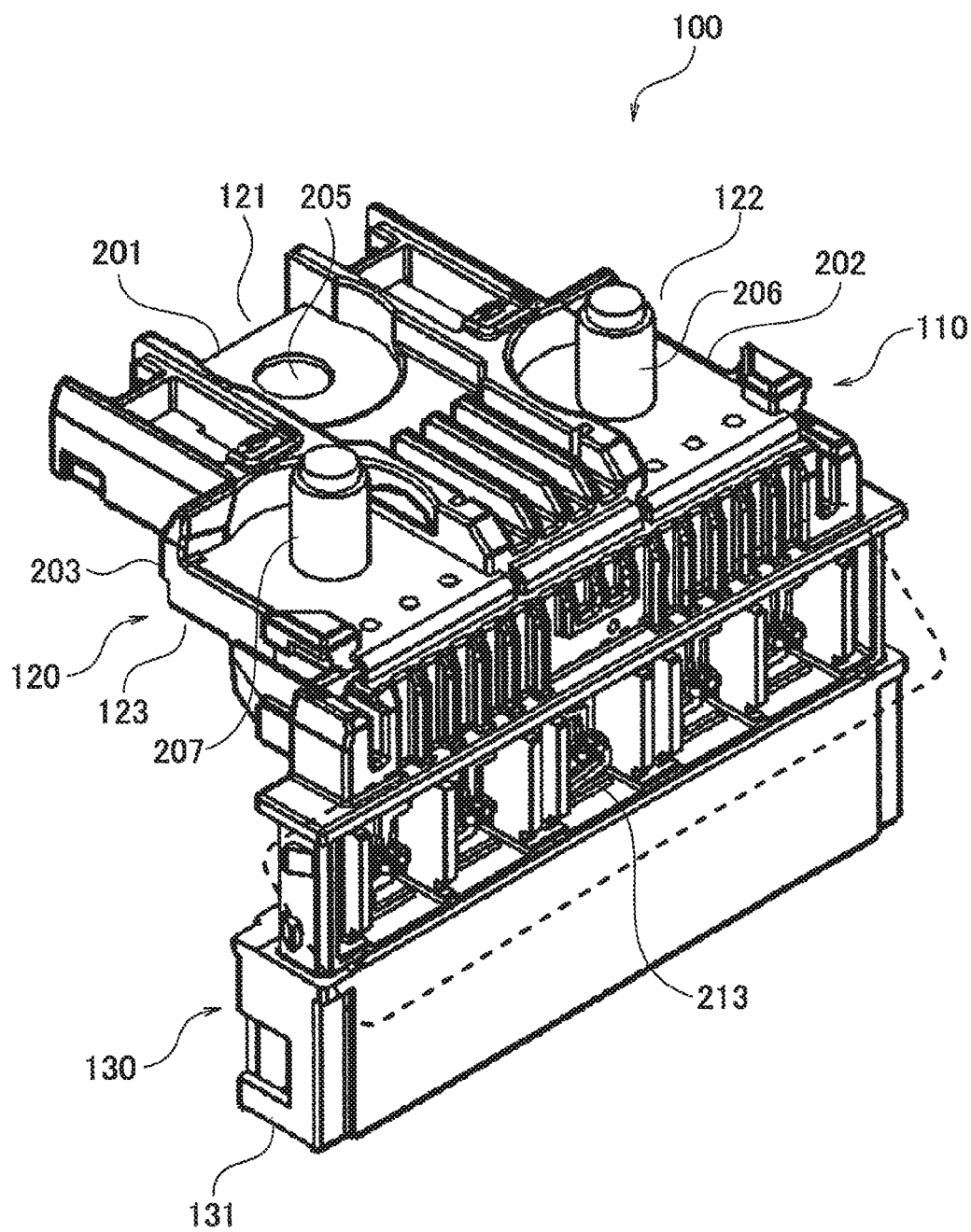
FIG. 1 is a perspective view showing a conventional fuse unit.
Figure 2:
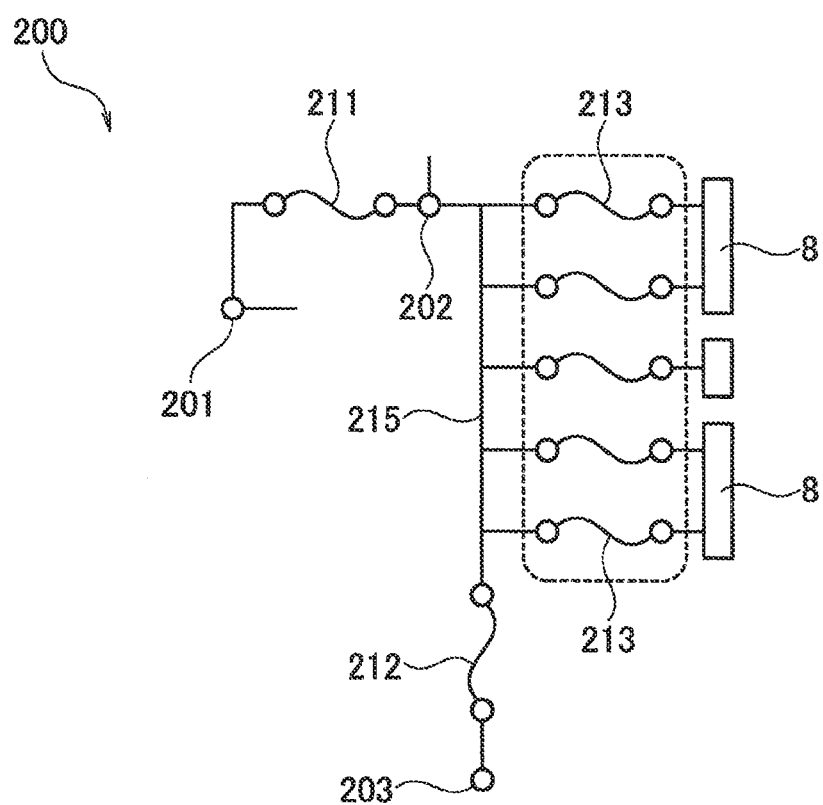
FIG. 2 is a circuit diagram of a circuit body used in the conventional fuse unit.
Figure 3:
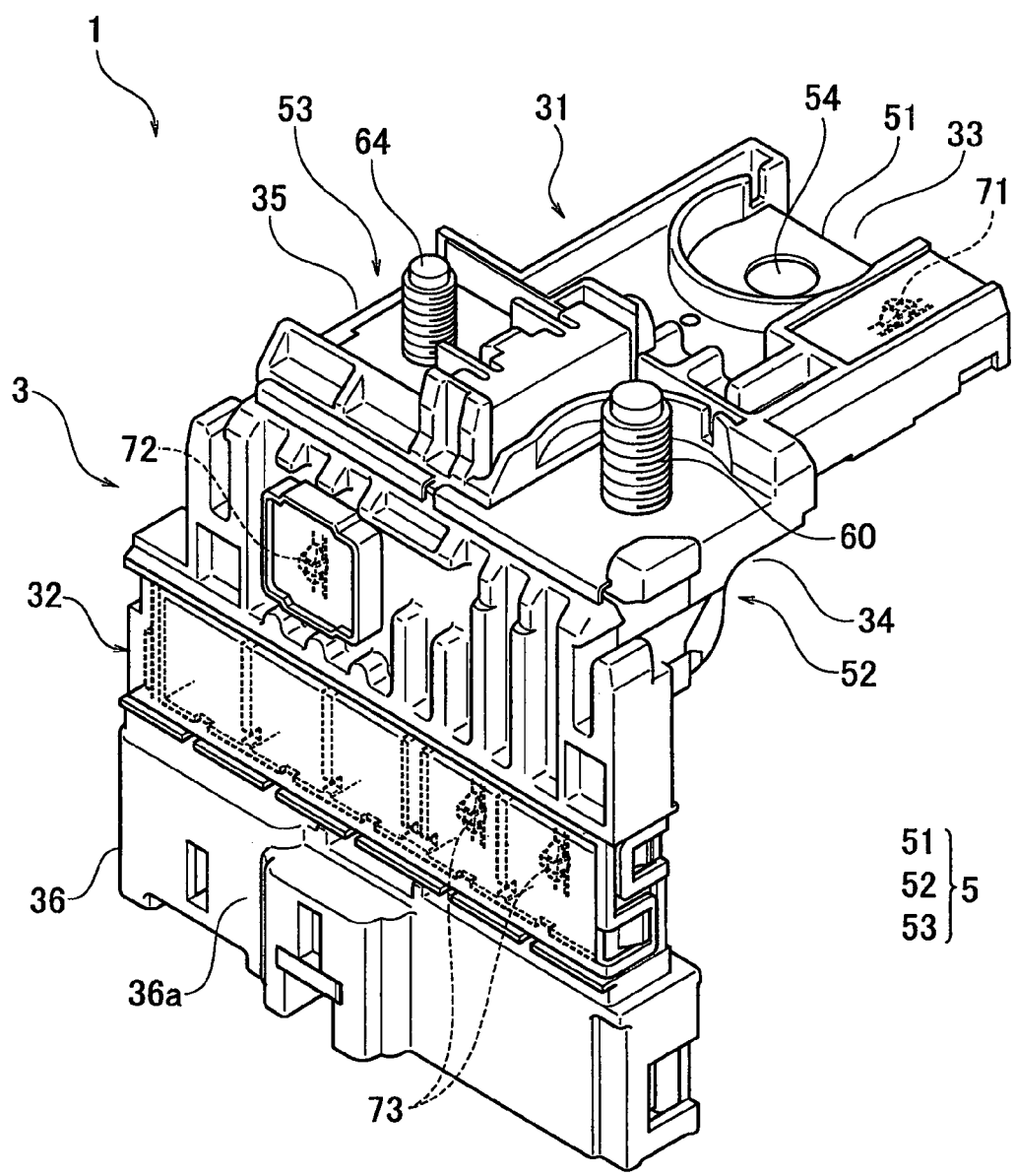
FIG. 3 is a perspective view showing an entire fuse unit according to an embodiment of the present invention.
Figure 4:
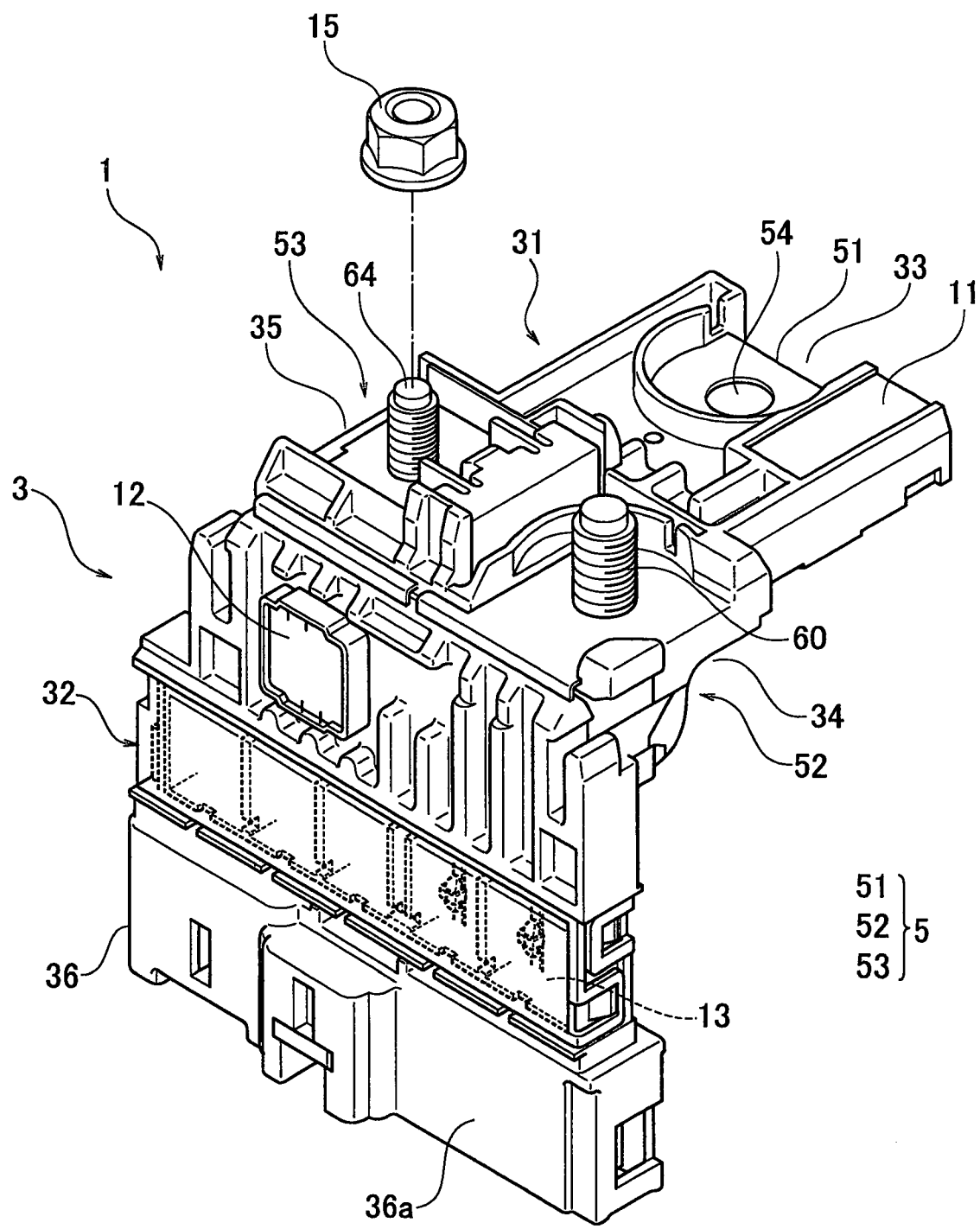
FIG. 4 is a perspective view showing the fuse unit and cover members attached to the fuse unit according to the embodiment of the present invention.
Figure 5:
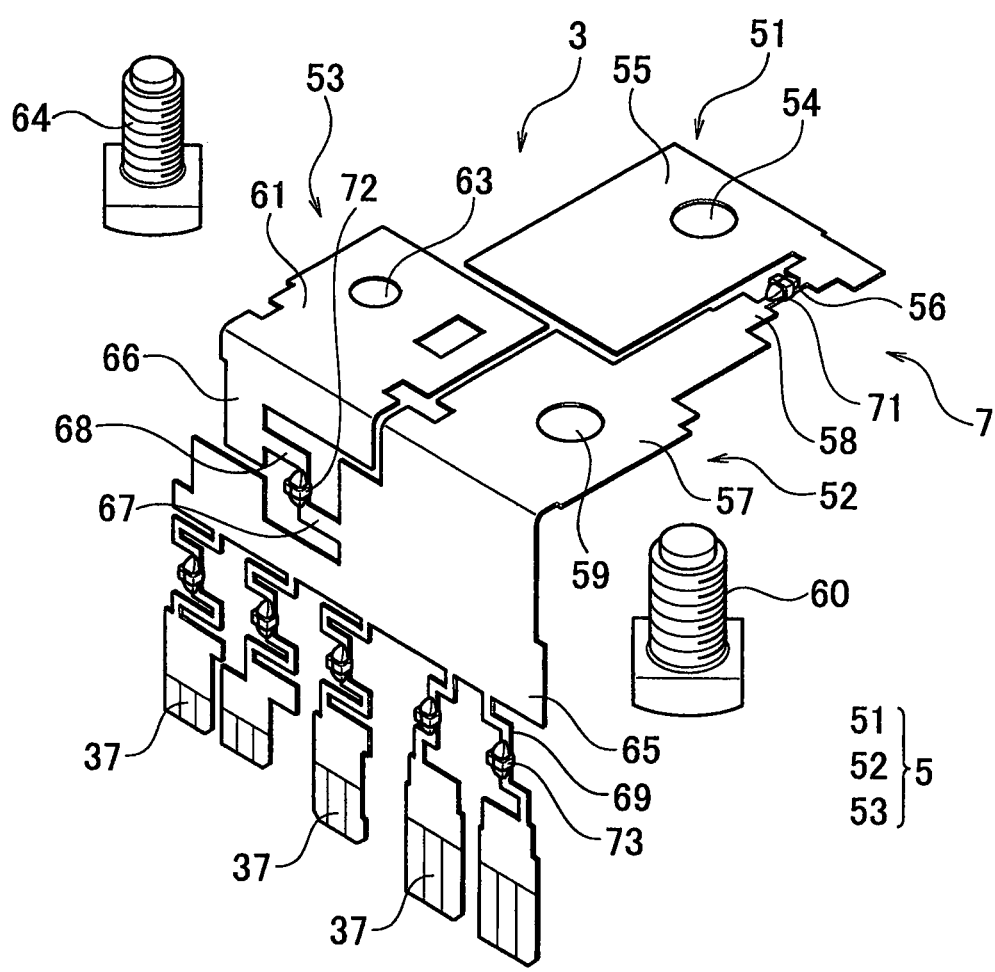
FIG. 5 is a perspective view showing a circuit body according to the embodiment of the present invention.

FIG. 3 to FIG. 5 are views each showing a fuse unit 1 according to the embodiment of the present invention.

The fuse unit 1 charges a first battery and a second battery (not shown in the figures) mounted on a vehicle with electricity generated by an alternator (not shown in the figures) through driving of the vehicle. The fuse unit 1 includes a charging circuit for supplying currents from the first battery, the second battery and the alternator to loads (electrical components) installed in the vehicle.

The fuse unit 1 includes a unit main body 3 serving as an outer frame, a circuit body (busbar) 5 made of a conductive metal plate, and a fusible body 7.

The unit main body 3 includes an upper surface portion 31 and a side surface portion 32. The fuse unit 3 is formed into an L-shape bent substantially at a right angle in a manner such that one end of the upper surface portion 31 is continuously connected to the side surface portion 32. The upper surface portion 31 of the unit main body 3 is placed and fixed onto the upper surface of the first battery so that the side surface portion 32 is positioned along the side surface of the first battery. Thus, the fuse unit 1 is attached to the first battery in a hanging state. The unit main body 3 is made of an insulating resin.

The upper surface portion 31 of the unit main body includes a first battery connecting portion 33, an alternator connecting portion 34 and a second battery connecting portion 35. As described below, the first battery connecting portion 33 is provided with a first battery connecting end 51 of the circuit body 5 and connected to the first battery. The alternator connecting portion 34 is provided with an alternator connecting end 52 of the circuit body 5 and connected to the alternator. The second battery connecting portion 35 is provided with a second battery connecting end 53 of the circuit body 5 and connected to the second battery. The fuse unit 1 has a configuration in which the connecting portions 33 and 35 (the connecting ends 51 and 53 of the circuit body 5) to be connected to the two onboard batteries and the connecting portion 34 (the connecting end 52 of the circuit body 5) to be connected to the onboard alternator are all located at the upper surface portion 31 of the unit main body 3. Therefore, the connection of the fuse unit 1 with the two batteries and the alternator can be implemented only at the upper surface portion of the unit main body 3.

The side surface portion 32 of the unit main body 3 is provided with a load connecting portion 36 to be connected with a plurality of onboard loads. Thus, the fuse unit 1 is connected to the onboard loads at the side surface portion 32 of the unit main body 3. The load connecting portion 36 has a connector structure to which connectors to be mated from the loads are fitted. A connector housing 36a is shown in FIG. 3 and FIG. 4.

The first battery connecting portion 33, the alternator connecting portion 34 and the second battery connecting portion 35 are located at each apex of a triangle in the upper surface portion 31 of the unit main body 3. However, the respective connecting portions may be arranged in line as long as these are located at the upper surface portion 31.

The circuit body 5 is integrally buried in the unit main body 3; however, part of the circuit body 5 necessary for electrical connection is exposed on the unit main body 3 as appropriate. As shown in FIG. 3 and FIG. 4, the circuit body 5 includes the first battery connecting end 51 corresponding to the first battery connecting portion 33, the alternator connecting end 52 corresponding to the alternator connecting portion 34, and the second battery connecting end 53 corresponding to the second battery connecting portion 35. The fusible body 7 is integrated with the circuit body 5 and includes a first fusible portion 71, a second fusible portion 72 and third fusible portions 73.

FIG. 5 is a view showing the circuit body 5 integrated with the fusible body 7.

The first battery connecting end 51 includes a plate-like first battery terminal portion 55 provided with an insertion hole 54, and an alternator-side terminal portion 56 aligned and connected with the first battery terminal portion 55. A connecting bolt (not shown in the figures) of a battery terminal connected to a battery post of the first battery is inserted into the insertion hole 54. The connecting bolt is attached to the battery terminal in such a manner as to project from the upper surface of the first battery. The first battery connecting end 51 is thus connected to the first battery through the insertion of the connecting bolt.

The alternator connecting end 52 includes a plate-like alternator terminal portion 57, and a first battery-side terminal portion 58 extending from the alternator terminal portion 57 toward the alternator-side terminal portion 56 of the first battery connecting end 51. The alternator terminal portion 57 is provided with a bolt insertion hole 59. An alternator connecting bolt 60 is inserted and attached into the bolt insertion hole 59. The alternator connecting bolt 60 is attached to the alternator terminal portion 57 in such a manner as to extend upward in the same direction as the connecting bolt of the battery terminal of the first battery. The alternator connecting bolt 60 has a lower portion buried in the upper surface portion 31 of the unit main body 3. The alternator connecting bolt 60 is connected to the onboard alternator via a terminal of a wire. The alternator connecting end 52 is thus connected to the alternator.

The first battery-side terminal portion 58 of the alternator connecting end 52 faces the alternator-side terminal portion 56 of the first battery connecting end 51. These terminal portions 58 and 56 are connected together via the first fusible portion 71 of the fusible body 7. Since the first battery connecting end 51 is connected to the alternator via the alternator connecting end 52, the first battery connected with the first battery connected end 51 is charged by the alternator. The first fusible portion 71 blows out once an overcurrent from the alternator flows therethrough so as to protect the circuit body 5 and prevent a flow of the overcurrent through the first battery.

The second battery connecting end 53 includes a plate-like second battery terminal portion 61 aligned with the alternator terminal portion 57 of the alternator connecting end 52. The second battery terminal portion 61 is provided with a bolt insertion hole 63. A second battery connecting bolt 64 is inserted and attached into the bolt insertion hole 63. The second battery connecting bolt 64 has a lower portion buried in the upper surface portion 31 of the unit main body 3. The second battery connecting bolt 64 is attached to the second battery terminal portion 61 in such a manner as to extend upward in the same direction as the alternator connecting bolt 60, namely, in the same direction as the battery terminal of the first battery. The second battery connecting bolt 64 is connected to the second battery via a terminal of a wire. The second battery connecting end 53 is thus connected to the second battery. Here, the wire from the second battery is connected to the second battery connecting bolt 64 in a manner such that a fastening nut 15 made of an insulating resin such as nylon (trade name) is screwed onto the second battery connecting bolt 64.

As described above, the alternator connecting bolt 60 extends in the same direction as the battery terminal of the first battery, and the second battery connecting bolt 64 extends in the same direction as the alternator connecting bolt 60. Namely, the alternator connecting bolt 60 and the second battery connecting bolt 64 both extend in the same direction as the battery terminal of the first battery. Therefore, the alternator connecting end 52 and the second battery connecting end 53 are located at the upper surface portion 31 of the unit main body 3 in the same manner as the first battery connecting end 51.

The alternator connecting end 52 is integrated with a plate-like load-side terminal portion 65 bent substantially at a right angle and hanging from the alternator terminal portion 57. The second battery connecting end 53 is integrated with a plate-like connecting terminal portion 66 bent substantially at a right angle and hanging from the second battery terminal portion 61. The load-side terminal portion 65 and the connecting terminal portion 66 are positioned along the side surface portion 32 of the unit main body 3.

The load-side terminal portion 65 of the alternator connecting end 52 and the connecting terminal portion 66 of the second battery connecting end 53 are provided with a second battery-side terminal portion 67 and an alternator-side terminal portion 68, respectively, extending in the direction coming closer together. These terminal portions 67 and 68 are connected together via the second fusible portion 72 of the fusible body 7. Since the second battery connecting end 53 is connected to the alternator via the alternator connecting end 52, the second battery connected with the second battery connecting end 53 is charged by the alternator. The second fusible portion 72 blows out once an overcurrent from the alternator flows therethrough so as to protect the circuit body 5 and prevent a flow of the overcurrent through the second battery.

The load-side terminal portion 65 of the alternator connecting end 52 is integrated with a plurality of connecting terminals 69. The respective connecting terminals 69 face connector connecting terminal portions 37 located in the connector housing 36a of the unit main body 3. The connecting terminals 69 are connected to the connector connecting terminal portions 37 via the third fusible portions 73 of the fusible body 7. The connector connecting terminal portions 37 are connected to the onboard loads 8 (FIG. 5) via the connectors to be mated. Thus, the current from the alternator is supplied to the onboard loads 8. The third fusible portions 73 each blow out once an overcurrent from the alternator flows therethrough so as to protect the loads against the overcurrent.

According to the present embodiment, as shown in FIG. 3 to FIG. 5, the alternator connecting bolt 60 has a greater diameter, and the second battery connecting bolt 64 has a smaller diameter. Since the alternator connecting bolt 60 has a different diameter from the second battery connecting bolt 64, incorrect assembly of the alternator connecting bolt 60 and the second battery connecting bolt 64 can be avoided.

In the fuse unit 1, the alternator connecting bolt 60 connected to the alternator extends in the same direction as the battery terminal projecting from the upper surface of the first battery, and the second battery connecting bolt 64 connected to the second battery extends in the same direction as the alternator connecting bolt 60. Since the alternator connecting bolt 60 and the second battery connecting bolt 64 extend in the same direction, the alternator connecting end 52 to be connected to the alternator connecting bolt 60 and the second battery connecting end 53 to be connected to the second battery connecting bolt 64 are both located at the upper surface portion 31 of the unit main body 3 in the same manner as the first battery connecting end 51.

Therefore, the connection of the fuse unit 1 with the first battery, the second battery and the alternator can be implemented only at the upper surface portion 31 of the unit main body 3. As a result, the connecting operation can be simplified and efficiently carried out in a small working space.

If the respective terminals of the wires are connected to the wrong bolts, the attachment of the terminals of the wires results in failure or is not stabilized, since the diameter of the alternator connecting bolt 60 is different from that of the second battery connecting bolt 64. This prevents incorrect attachment of the terminals of the wires and accordingly, the connection of the fuse unit 1 can be implemented reliably.

The first battery connecting end 51, the alternator terminal portion 57 of the alternator connecting end 52 into which the alternator connecting bolt 60 is to be inserted, and the second battery terminal portion 61 of the second battery connecting end 53 into which the second battery connecting bolt 64 is to be inserted are located at the upper surface portion 31 of the unit main body 3. Therefore, the first battery connecting end 51, the alternator terminal portion 57 and the second battery terminal portion 61 are located on the upper surface of the first battery in the state where the fuse unit 1 is installed in the vehicle. Namely, the fuse unit 1 has a configuration in which the first fusible portion 71 connecting the first battery connecting end 51 and the alternator connecting end 52 is located on the upper surface of the first battery (at the upper surface portion 31 of the unit main body 3), the second fusible portion 72 connecting the second battery connecting end 53 and the alternator connecting end 52 is located on the side surface of the first battery (at the side surface portion 32 of the unit main body 3), and the third fusible portions 73 connecting the alternator connecting end 52 and the loads 8 are located on the side surface of the first battery (at the side surface portion 32 of the unit main body 3). Accordingly, cover members for covering the first fusible portion 71, the second fusible portion 72 and the third fusible portions 73 can each be formed into a simple shape.

In particular, as shown in FIG. 4, a first cover member 11 formed substantially into a U-shape is inserted into a portion where the first fusible portion 71 is arranged at the upper surface portion 31 of the unit main body 3 so as to cover the first fusible portion 71. With regard to the second fusible portion 72, a pair of plate-like second cover members 12 is inserted into a portion where the second fusible portion 72 is arranged at the side surface portion 32 of the unit main body 3 so as to cover the second fusible portion 72. With regard to the third fusible portions 73, a third cover member 13 formed into a box shape elongated in the lateral direction is arranged over the side surface portion 32 of the unit main body 3 so as to cover the third fusible portions 73.

Although the present embodiment employs the configuration in which the alternator connecting bolt 60 has a greater diameter and the second battery connecting bolt 64 has a smaller diameter, the alternator connecting bolt 60 may have a smaller diameter and the second battery connecting bolt 64 may have a greater diameter.

What is claimed is:

1. A fuse unit used for a charging circuit in a vehicle for charging a first battery having a battery post, and a second battery mounted on the vehicle with electricity generated by a generator through driving of the vehicle, the fuse unit comprising:
   an insulating unit main body;
   a conductive circuit body integrally buried in the unit main body, the circuit body including,
      a first battery connecting end connected to the first battery,
      an alternator connecting end connected to the generator, and
      a second battery connecting end connected to the second battery; and
   a fusible body, connected to the circuit body, for blocking a current flow path when an overcurrent flows therethrough, the fusible body including,
      a first fusible portion formed between the first battery connecting end and the alternator connecting end,
      a second fusible portion formed between the alternator connecting end and the second battery connecting end, and
      a third fusible portion formed between the alternator connecting end and an electrical component installed in the vehicle,
   wherein the first battery connecting end is provided with an insertion hole into which a connecting bolt attached to a battery terminal connected to the battery post of the first battery and projecting from an upper surface of the first battery, is inserted,
   the alternator connecting end is provided with an alternator connecting bolt buried in the unit main body and extending in a direction identical with that in which the battery terminal extends,
   the second battery connecting end is provided with a second battery connecting bolt buried in the unit main body and extending in a direction identical with that in which the alternator connecting bolt extends, and
   the alternator connecting bolt to be electrically connected to a terminal of an alternator wire has a diameter different from that of the second battery connecting bolt to be electrically connected to a terminal of a second battery wire, wherein
   the alternator connecting end comprise an integrated plate-like load-side terminal portion bent substantially at a right angle and hanging from an alternator terminal portion,
   the second battery connecting end comprises an integrated plate-like connecting terminal portion bent substantially at a right angle and hanging from a second battery terminal portion,
   the load-side terminal portion of the alternator connecting end and the connecting terminal portion of the second battery connecting end are provided with a second battery-side terminal portion and an alternator-side terminal portion, respectively, extending in a direction coming closer together,
   the second battery-side terminal portion and the alternator-side terminal portion are connected together via the second fusible portion, and the second battery connecting end is connected to the generator via the alternator connecting end such that the second battery connected with the second battery connecting end is charged by the generator and the second fusible portion protects the circuit body from an overcurrent through the second battery.

2. The fuse unit according to claim 1, wherein
the insulating unit main body main body comprises an upper surface portion and a side surface portion,
the fuse unit comprises an L-shape bent substantially at a right angle in a manner such that one end of the upper surface portion is continuously connected to the side surface portion,
the upper surface portion of the insulating unit main body is placed and fixed onto the upper surface of the first battery so that the side surface portion is positioned along the side surface of the first battery.

3. The fuse unit according to claim 2, wherein the upper surface portion of the insulating unit main body comprises a first battery connecting portion, an alternator connecting portion and a second battery connecting portion.

4. The fuse unit according to claim 3, wherein the first battery connecting portion, the alternator connecting portion and the second battery connecting portion are located at each apex of a triangle formed thereby on the upper surface portion of the insulating unit main body.

5. The fuse unit according to claim 3, wherein the first battery connecting portion, the alternator connecting portion and the second battery connecting portion are located in a line formed thereby on the upper surface portion.

6. The fuse unit according to claim 2, wherein the side surface portion of the insulating unit main body is provided with a load connecting portion to be connected with a plurality of onboard loads.

7. The fuse unit according to claim 2, wherein
the load-side terminal portion and the connecting terminal portion are positioned along the side surface portion of the insulating unit main body.

8. The fuse unit according to claim 1, wherein
the alternator terminal portion is provided with a bolt insertion hole, and
the alternator connecting end further comprises:
a first battery-side terminal portion extending from the alternator terminal portion toward the alternator-side terminal portion of the first battery connecting end.

9. The fuse unit according to claim 8, wherein
the first battery-side terminal portion of the alternator connecting end faces the alternator-side terminal portion of the first battery connecting end,
the first battery-side terminal portion and the alternator-side terminal portion are connected together via the first fusible portion, and
the first battery connecting end is connected to the generator via the alternator connecting end such that the first battery connected with the first battery connected end is charged by the generator and the first fusible portion protects the circuit body from an overcurrent through the first battery.

10. The fuse unit according to claim 1, wherein the second battery terminal portion is provided with a bolt insertion hole and aligned with the alternator terminal portion of the alternator connecting end.

11. The fuse unit according to claim 1, wherein
the load-side terminal portion of the alternator connecting end comprises an integrated plurality of connecting terminals,
respective ones of the plurality of connecting terminals face connector connecting terminal portions located in a connector housing of the insulating unit main body, and
the respective connecting terminals are connected to the connector connecting terminal portions via respective fusible elements of the third fusible portion of the fusible body and the connector connecting terminal portions are connected to onboard loads such that current from the generator is supplied to the onboard loads and the third fusible portion protects the onboard loads against the overcurrent.

12. The fuse unit according to claim 1, wherein the alternator connecting bolt has a greater diameter than the second battery connecting bolt.

13. The fuse unit according to claim 1, wherein the alternator connecting bolt has a smaller diameter than the second battery connecting bolt.

14. The fuse unit according to claim 1, wherein the alternator connecting bolt has the diameter different from that of the second battery connecting bolt such that an incorrect attachment of the terminal of the alternator wire to be connected to the alternator connecting bolt and the terminal of the second battery wire to be connected to the second battery connecting bolt is prevented.

15. The fuse unit according to claim 1, wherein the alternator connecting bolt has the diameter different from that of the second battery connecting bolt such that in a condition that the terminal of the alternator wire to be electrically connected to the alternator connecting bolt and the terminal of the second battery wire to be connected to the second battery connecting bolt are connected to the wrong bolts, the attachment of the terminal of the alternator wire to be connected to the alternator connecting bolt and the terminal of the second battery wire to be connected to the second battery connecting bolt the terminals of the wires results in one of: failure or unstable connection due to the different diameter of the alternator connecting bolt and the second battery connecting bolt.

16. The fuse unit according to claim 1, further comprising cover members that cover the first fusible portion, the second fusible portion and the third fusible portions.

17. The fuse unit according to claim 16, wherein
the cover members comprise a first cover member covering the first fusible portion, a pair of plate-like second cover members covering the second fusible portion, and a third cover member covering the third fusible portion, and
the first cover member comprises a U-shape covering the first fusible portion, and the third cover member comprises a box shape elongated in the lateral direction covering the third fusible portion.

* * * * *